US006910506B2

(12) United States Patent
Gabriel et al.

(10) Patent No.: US 6,910,506 B2
(45) Date of Patent: Jun. 28, 2005

(54) EXHAUST PIPE, AND METHOD OF MAKING AN EXHAUST PIPE

(75) Inventors: Heinrich Gabriel, Borgentreich (DE); Albrecht Bolte, Liebenau (DE); Erhardt Humburg, Warburg (DE); Christian Smatloch, Paderborn (DE); Jürgen Kleinschmidt, Beverungen (DE)

(73) Assignee: Benteler Automobiltechnik GmbH, Paderborn (DE)

(*) Notice: Subject to any disclaimer, the term of this patent is extended or adjusted under 35 U.S.C. 154(b) by 78 days.

(21) Appl. No.: 10/292,890

(22) Filed: Nov. 12, 2002

(65) Prior Publication Data

US 2003/0094208 A1 May 22, 2003

(30) Foreign Application Priority Data

Nov. 21, 2001 (DE) .......................................... 101 57 131

(51) Int. Cl.[7] .............................................. F16L 11/00
(52) U.S. Cl. ....................... 138/114; 138/109; 138/121; 138/148; 138/155
(58) Field of Search ................................ 138/109, 114, 138/120, 121, 148, 149, 155

(56) References Cited

U.S. PATENT DOCUMENTS

| | | | | | |
|---|---|---|---|---|---|
| 3,685,546 A | * | 8/1972 | Sigmund | ...................... | 285/47 |
| 4,031,700 A | * | 6/1977 | Yamazaki et al. | ............. | 60/322 |
| 4,142,366 A | * | 3/1979 | Tanahashi et al. | ............. | 60/322 |
| 4,345,430 A | * | 8/1982 | Pallo et al. | .................... | 60/282 |
| 4,846,147 A | * | 7/1989 | Townsend et al. | ...... | 126/307 R |
| 5,099,888 A | * | 3/1992 | Valls, Jr. | ...................... | 138/109 |
| 5,340,165 A | * | 8/1994 | Sheppard | .................... | 285/226 |
| 5,363,544 A | * | 11/1994 | Wells et al. | .................. | 29/523 |
| 5,390,494 A | * | 2/1995 | Clegg | .......................... | 60/299 |
| 5,495,873 A | * | 3/1996 | Butkiewicz et al. | ........ | 138/114 |
| 5,953,912 A | * | 9/1999 | Kaiho et al. | .................. | 60/323 |
| 6,216,742 B1 | * | 4/2001 | Masui et al. | ................. | 138/121 |
| 6,354,632 B1 | * | 3/2002 | Jung et al. | ..................... | 285/49 |
| 2002/0096225 A1 | * | 7/2002 | Ishizu et al. | ................. | 138/114 |

FOREIGN PATENT DOCUMENTS

| | | |
|---|---|---|
| DE | 35 06 219 C2 | 9/1986 |
| DE | 199 29 423 A1 | 1/2000 |
| DE | 198 57 445 A1 | 6/2000 |

* cited by examiner

*Primary Examiner*—James Hook
(74) *Attorney, Agent, or Firm*—Henry M. Feiereisen

(57) ABSTRACT

An exhaust pipe includes first and second length portions, each having an outer pipe and an inner pipe positioned relative to one another to define an annular gap therebetween. The length portions are placed in confronting disposition with their adjacent first ends interconnected for relative movement in a longitudinal direction. An end piece of the outer pipe of the first length portion is disposed in surrounding relationship to an end piece of the outer pipe of the second length portion at interposition of an end portion of the inner pipe of the first length portion, wherein the end pieces of the outer pipes of the first and second length portions and the end portion of the inner pipe of the first length portion are positioned for relative movement in the longitudinal direction, so as to define a triple sliding fit.

13 Claims, 2 Drawing Sheets

EXHAUST PIPE, AND METHOD OF MAKING AN EXHAUST PIPE

CROSS-REFERENCES TO RELATED APPLICATIONS

This application claims the priority of German Patent Application, Serial No. 101 57 131.3, filed Nov. 21, 2001, pursuant to 35 U.S.C. 119(a)–(d).

BACKGROUND OF THE INVENTION

The present invention relates to an exhaust pipe, and to a method of making an exhaust pipe.

Internal combustion engines are generally equipped heretofore with a three-way catalytic converter for emission control. Three-way catalytic converters require a particular starting temperature to assume the actual emission control function. Regulatory exhaust standards demand an increasingly shorter time period for the catalytic converter to reach the starting temperature, the so-called "light of time", whereby an operating temperature of >350° C. should be reached in shortest possible time.

The use of air gap insulated exhaust pipes between the cylinder outlet and the catalytic converter is one approach to conform to these standards. Air gap insulated exhaust pipes are typically designed in double-walled configuration and include a thin-walled inner pipe portion and an outer pipe portion of greater wall thickness, which are separated from one another by an air gap. The insulating effect of the air gap, the small mass of the inner pipe and the resultant low heat capacity of the inner pipe cause minimal heat loss so that the catalytic converter can quickly reach in the starting phase the required starting temperature. The outer pipe provides hereby a supporting and sealing function.

Air gap insulated exhaust pipes have also been used to connect the cylinder discharge with an exhaust turbocharger. The reduced heat loss of an air gap insulated exhaust pipe results in a withdrawal of less energy from the exhaust during its paths to the exhaust turbocharger compared to configurations without air gap insulation, so that more energy is available at the exhaust turbocharger for conversion. An air gap insulated exhaust pipe thus enhances the efficiency of an exhaust turbocharger.

The attachment of the exhaust pipe between two fixed attachment points, e.g., an exhaust manifold and an exhaust turbocharger, poses, however, a problem. The outer pipe should be able to compensate its own thermal expansion as well as possible thermal expansions of adjacent components, such as the manifold or the exhaust turbocharger. In addition, the rapid temperature increase in an exhaust pipe results in a temperature drop between the inner pipe and the outer pipe so that additional relative movements between inner and outer pipes have to be compensated. The use of expansion compensating members has been proposed to address this demand in order to allow a relative movement between the inner and outer pipes.

It would be desirable and advantageous to provide an improved exhaust pipe which obviates prior art shortcomings and which is able to compensate in a simple manner thermal length changes.

It would also be desirable and advantageous to provide an improved method for manufacture of an exhaust pipe, which is gentle to the material used and allows easy assembly.

SUMMARY OF THE INVENTION

According to one aspect of the present invention, an exhaust pipe includes a first and second length portions, each having an outer pipe and an inner pipe positioned relative to one another to define an annular gap therebetween, wherein the first and second length portions are placed in confronting disposition with their adjacent first ends interconnected for relative movement in a longitudinal direction, with an end piece of the outer pipe of the first length portion disposed in surrounding relationship to an end piece of the outer pipe of the second length portion at interposition of an end portion of the inner pipe of the first length portion, wherein the end pieces of the outer pipes of the first and second length portions and the end portion of the inner pipe of the first length portion are positioned for relative movement in the longitudinal direction, thereby realizing a dual sliding fit.

Since the end portion of the inner pipe of the first length portion engages between both end pieces of the outer pipes, an effective and reliable positioning of the end portion of the inner pipe is realized.

According to another feature of the present invention, the inner pipe of the second length portion has in the area of the adjacent ends of the first and second length portions an end portion which is positioned relative to the end piece of the outer pipe of the second length portion for movement in the longitudinal direction. The result is the presence of only a single, very compact thermal bridge in the area of the ends of the length portions to realize a triple sliding fit. On the one hand, the inner pipe of the first length portion is movable relative to the outer pipe of the first length portion and at the same time is movable relative to the end piece of the outer pipe of the second length portion. Suitably, the end portion of the inner pipe of the second length portion abuts against the end piece of the outer pipe of the second length portion.

This arrangement of the end portions and end pieces enables a compensation of great heat expansions between the individual inner pipes, between the individual outer pipes as well as between the outer pipes relative to the inner pipes. Through this particular configuration of a triple sliding fit configuration, an effective annular gap is maintained over the entire length of the exhaust pipe, without any further thermal bridges.

According to another feature of the present invention, the adjacent ends of the first and second length portions may be connected to one another in a fluid-tight manner. The end pieces of the outer pipes may be placed in immediate abutting relationship with the end portions of the inner pipes. This, of course, is not necessarily required because it is also possible to provide an indirect contact between these components via interposed sealing parts which prevent an escape of exhaust gases from the exhaust pipe.

According to another feature of the present invention, there may be provided an encapsulating member for encasing the overlapping end pieces of the outer pipes of the first and second length portions in a fluid-tight manner to thereby compensate relative movements between the end pieces. Compared to the incorporation of sealing parts within the sliding fit, the application of a fluid-tight encapsulation by using a separate encapsulating member has an advantage because the sliding fit can be configured simpler. The placement of the encapsulating member upon the outer pipes to compensate relative movements results in a functional separation in the area of the sliding fit. The fluid-tight encapsulation is realized by the separate encapsulating member while the compensation of the relative movement is effected by a triple sliding fit.

The use of a bellows is suitable for compensating relative movements while at the same time realizing the fluid-tight encapsulation of the exhaust pipe. Depending on the required service life, the bellows may basically be a replacement part of the exhaust pipe. The geometry of the bellows can easily be modified, for example through changing the number of folds.

According to another feature of the present invention, the first and second length portions have second ends facing away from the adjacent ends, wherein flanges may be provided for attachment to the second ends of the first and second length portions in one-to-one correspondence. Hereby, the outer pipes and the inner pipes of the length portions may be securely fixed, at least indirectly, with the flanges. These flanges are provided for attachment of the exhaust pipe to other components of the internal combustion engine, such as e.g. an exhaust turbocharger or a catalytic converter. Thus, the flanges represent fixed bearings for the length portions of the exhaust pipe. The constructive configuration of the fixed bearings depends on the respective requirements at hand. The individual length portions may be connected with the flanges, e.g., through force-fitting engagement or form-fitting engagement. The outer pipes of the exhaust pipe may also be pushed into the flanges. While the outer pipes are securely fixed to the flanges, in particular welded, the inner pipes may be directly welded to the flanges or welded to the outer pipes for connection to the flanges.

In order to realize smallest possible exhaust counterpressures, the inner pipe of the second length portion has a constant inner diameter which corresponds to an inner diameter of the first inner pipe in the area of the annular gap of the second length portion. To ensure clarity, the term "constant inner diameter" relates here in conjunction with manufacturing tolerances to an inner diameter that remains substantially the same in each cross sectional plane transversely to the longitudinal dimension of the exhaust pipe. Hereby, the exhaust pipe does not necessarily require a circular cross-section. Of course, a cross-section deviating from the circular configuration is conceivable as well, such as e.g. an elliptic shape.

Heat losses can be minimized when the outer pipes are reduced in diameter in the area of the second ends of the first and second length portions. Thus, the outer pipes approach the inner pipes only in the area of the ends of the length portions so that the annular gap is also reduced in size only in this area. Suitably, the flange-proximate end pieces of the outer pipes are reduced in diameter to such a degree as to bear upon the end portions of the inner pipe so as to engage the flange together with the end portions of the inner pipe.

According to another feature of the present invention, the first and second length portions may be made through an internal high-pressure forming process. Although the insulation of the exhaust pipe through provision of an air gap is satisfactory per se, a further enhancement can be attained by filling the air gap with insulating material.

According to another aspect of the present invention, a method of making an exhaust pipe, includes the steps of providing a double-walled pipe by placing an outer pipe, having a first and second length portions, relative to an inner pipe so as to form through an internal high-pressure forming process a first annular gap in the first length portion and a second annular gap in the second length portion; separating the first and second length portions in an area of adjacent ends; and joining the adjacent ends to form of a sliding fit therebetween by suitably matching diameters of the adjacent ends.

The internal high-pressure forming process of a double-walled pipe is gentle to the material and saves material during manufacture. In particular, when a transition zone between the adjacent ends of the length portions is cut out, only this transition zone is considered waste. As the transition zone can be configured very slender in the longitudinal direction through the internal high-pressure forming process, a removal of the transition zone can be implemented through a single parting cut, when the cutting tool has a suitable width. An example of a suitable cutting tool includes a saw blade.

According to another feature of the present invention, the adjacent ends are deburred before the joining step. Deburring facilitates an interconnection of the ends to form a sliding fit, especially in the presence of narrow tolerances.

The method according to the present invention can be advantageously applied when the outer pipe and the inner pipe adjoin one another in the area of the adjacent ends. The flat engagement of the inner pipe with the outer pipe in the area of the adjacent ends results in a secure placement of the inner pipe so that precise parting cuts are possible. The use of, e.g., mandrels placed in the inner pipe, to realize an added positional fixation of the inner pipe before the parting cut is not required. In particular, when the outer diameter of one end of the adjacent ends is smaller than the inner diameter of the other one of the adjacent ends, the end with smaller diameter can easily be inserted into the other end. Suitably, the ends are configured in their diameter in such a way that a clearance fit between the outer diameter of the end positioned inwardly and the inner diameter of the end position outwardly is established, so that a sliding fit between the individual length portions of the exhaust pipe is provided to compensate relative movements of the outer pipes and the inner pipes.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

It will be appreciated by persons skilled in the art that the depicted embodiment is to be understood as illustrative of the invention and not as limiting in any way.

Figure 1:
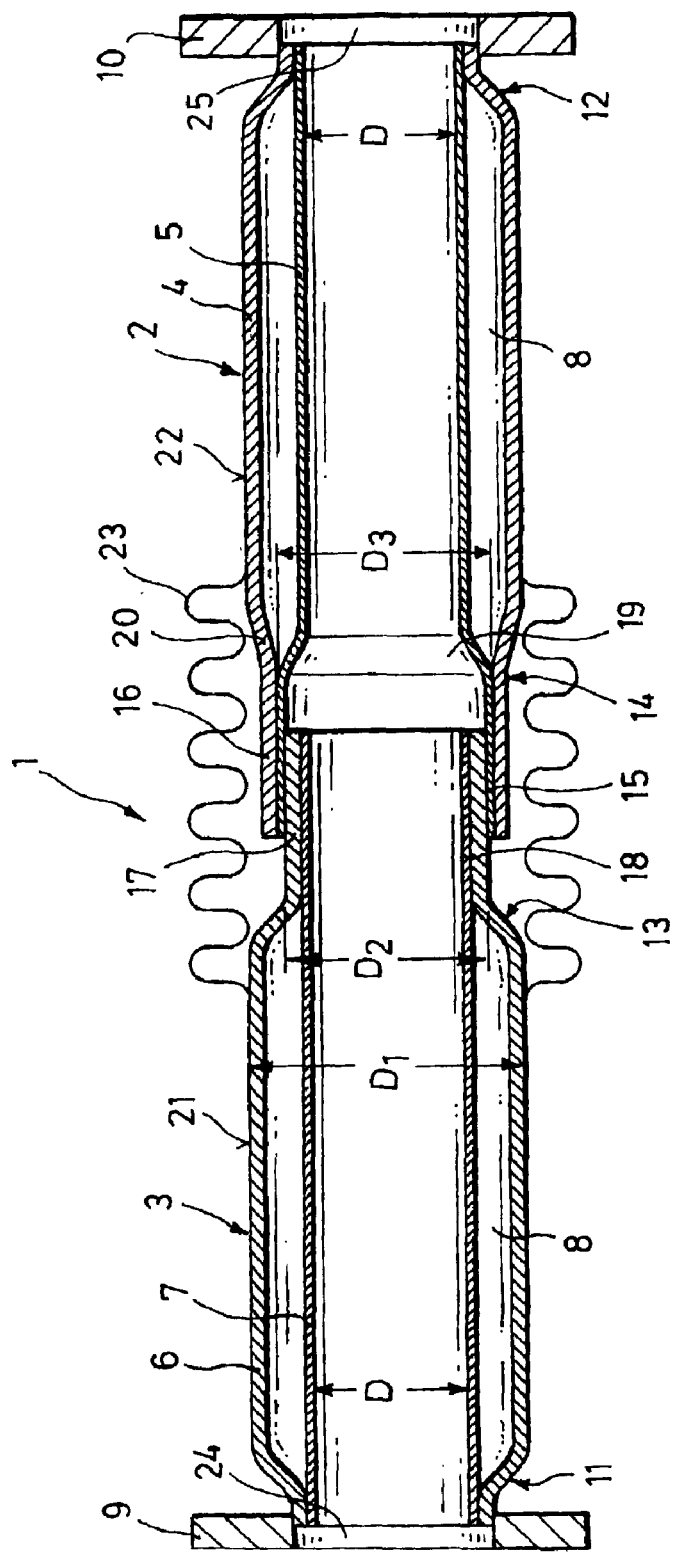
FIG. 1 is a longitudinal section of a double-walled exhaust pipe according to the present invention.

Turning now to the drawing, and in particular to FIG. 1, there is shown a longitudinal section of a double-walled exhaust pipe according to the present invention, generally designated by reference 1 and including a first length portion 2 and a second length portion 3. The exhaust pipe 1 is configured as double-walled pipe with a first outer pipe 4 and a first inner pipe 5 in the first length portion 2, and a second outer pipe 6 and a second inner pipe 7 in the second length portion 3. The outer pipes 4, 6 and the inner pipes 5, 7 are disposed in concentrate relationship, with an annular gap 8 being defined between the outer pipes 4, 6 and the inner pipes 5, 7. Although the exhaust pipe 1 is substantially straight in the non-limiting example of FIG. 1, it is, of course, also possible to configure the exhaust pipe in a curved fashion in its longitudinal dimension.

The exhaust pipe 1 extends between flanges 9, 10 at opposite ends 11, 12 for attachment of the exhaust pipe 1 to other components. The flanges 9, 10 serve hereby as fixed bearing for the individual length portions 2, 3 of the exhaust pipe 1. Hereby, the opposite ends 11, 12 of the length portions 2, 3 are securely fixed to the flanges 9, 10, respectively.

As shown in FIG. 1, the second length portion 3 is engaged here in the first length portion 2, whereby adjacent ends 13, 14 of the length portions 2, 3 are nested within one another to establish a particularly configured sliding fit that allows a relative movement in longitudinal direction as a result of heat-based length changes in the exhaust pipe 1. In this embodiment, an end portion 15 of the inner pipe 5 engages in the area of the adjacent ends 13, 14 of the length portions 2, 3 between an end piece 16 of the outer pipe 4 of the length portion 2 and an end piece 17 of the outer pipe 6 of the length portion 3. The end portion 15 of the inner pipe 5 is thus radially supported on two sides. On the one hand, the end portion 15 bears with its outer perimeter against the inner surface of the outer pipe 4 and at the same time with its inside surface begins the outer perimeter of the end piece 17 of the outer pipe 6 of the length portion 3. This configuration results in a dual sliding fit between the end pieces 16, 17 of the outer pipes 4, 6, because the end portion 15 is movable in longitudinal direction relative to the external end piece 16 as well as relative to the internal end piece 17.

A third bearing area of the sliding fit of the ends 13, 14 is realize between the second outer pipe 6 and the second inner pipe 7 of the second length portion 3. The second inner pipe 7 has over its entire length a constant inner diameter D and thus a constant flow cross section. Thus, the second outer pipe 6 tapers conically in the area of the end 13 confronting the other length portion 2 so that the outer pipe 6 bears upon an end portion 18 of the second in a pipe 7 in the area of its tapered end piece 17. In this way, the end piece 17 of the second outer pipe 6 is surrounded about its outer perimeter as well as its inner perimeter by components that relatively move in longitudinal direction, mainly the end portions 15, 18 of the inner pipes 5, 7.

As the inner diameter D of the inner pipe 7 of the length portion 3 is constant over its entire length, the outer diameter D1 of the outer pipe 6 tapers in the area of the annular gap 8 to an outer diameter D2 in the area of the end piece 17. This dimension is at the same time again the inner dimension for the inner pipe 5 which is widened by the inner diameter D via a conical transition 19 to the outer diameter D2 of the outer pipe 6. The diameter of the inner pipe 5 of the length portion 2 corresponds hereby to the diameter D of the second inner pipe 7 because the exhaust pipe 1 should exhibit a substantially constant flow cross section over the entire length.

To realize the sliding fit between the end piece 16 and the end portion 15 of the length portion 2, the inner diameter D3 of the outer pipe 4 of the length portion 2 is reduced via a conical transition 20 in the area of its end piece 16 to the outer dimension of the end portion 15.

The diameter in the area of the sliding fits are, of course, so selected that the thermal expansion does neither result in a warping in radial direction nor in a jamming in axial direction. Thus, the adjacent ends 13, 14 of the length portions 2, 3 should sufficiently overlap and the tolerances of the individual diameters should be selected that the components will not be pressed upon one another at higher temperatures to a degree that a relative movement of the length portions 2,3 would be impeded.

As a result of the required tolerances between the end portions 15, 18 and the end pieces 16, 17, a slight escape of gas between the adjacent ends 13, 14 is possible. The provision of a bellows 23 connected to the outer surfaces 21, 22 of the outer pipes 4, 6 prevents the escape of exhaust gases from the exhaust pipe 1. The length portions 2, 3 of the exhaust pipe 1 are thus connected to one another in a fluid-tight manner, whereby the configuration of the bellows 23 is able to compensate longitudinal movements between the length portions 2, 3. The bellows 23 may be connected permanently or detachably to the outer surfaces 21, 22.

At the flange-proximate ends 11, 12 of the length portions 2, 3, the diameter D1 of the outer pipes 4, 6 is also reduced to the dimension D2 like at the end 13 of the length portion 3, whereby the ends 11, 12 engage a flow-through opening 24, 25 of the flanges 9, 10.

Figure 2:
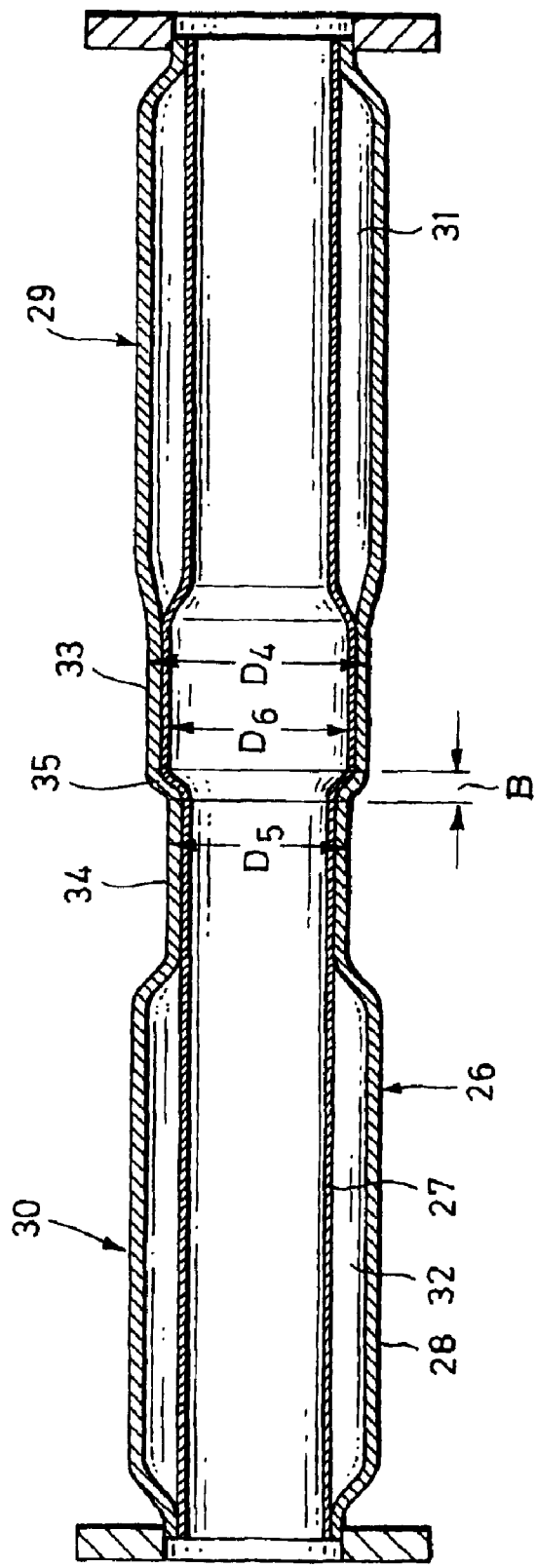
FIG. 2 is a longitudinal section of a double-walled pipe during an intermediate manufacturing stage for production of the exhaust pipe of FIG. 1.

Turning now to FIG. 2, there is shown a longitudinal section of an intermediate manufacturing stage for making the exhaust pipe 1 of FIG. 1. Starting material is a double-walled pipe 26 with an inner pipe 27 and an outer pipe 28. The pipe 26 is subdivided in a first length portion 29 and a second length portion 30, whereby an annular gap 31, 32 is defined in each length portion 29, 30 between the inner pipe 27 and the outer pipe 28. In a central region between the length portions 29 and 30, the outer pipe 26 is constricted in cross section in two steps. The constriction of the outer pipe 26 defines a region that is later transformed into the sliding fit. The length portions 29, 30 of the pipe 26 are separated from one another in a transition zone 35 which neighbors the adjacent ends 33, 34 in the area of the constriction. The transition zone 35 has a width B which can be cut out with a single parting cut between the adjacent ends 33, 34 by using, e.g., a suitably wide saw blade. Of course, is also possible to provide two distinct parting cuts to remove the transition zone 35.

In the area of the transition zone 35, there is also a transition between the greater outer diameter D4 of the one end 33 to the smaller outer diameter D5 of the other end 34. Hereby, the outer diameter D5 is smaller than the inner diameter D6 of the end 33 of the length portion 29. The outer diameter D5 and the inner diameter D6 of the adjacent ends 33,34 are so sized that they can be nested within one another to form a sliding fit after removal of the transition zone 35. Optionally, the ends 33,34 can additionally be deburred before being joined.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An exhaust pipe, comprising first and second length portions, each having an outer pipe and an inner pipe positioned relative to one another to define an annular gap therebetween, wherein the first and second length portions are placed in confronting disposition with their adjacent first ends interconnected for relative movement in a longitudinal direction, with an end piece of the outer pipe of the first length portion disposed in surrounding relationship to an end piece of the outer pipe of the second length portion at interposition of an end portion of the inner pipe of the first length portion, wherein the end pieces of the outer pipes of the first and second length portions and the end portion of the inner pipe of the first length portion are positioned for relative movement in the longitudinal direction.

2. The exhaust pipe of claim 1, wherein the inner pipe has in the area of the adjacent ends of the first and second length portions an end portion which is positioned relative to the end piece of the outer pipe of the second length portion for movement in the longitudinal direction.

3. The exhaust pipe of claim 2, wherein the end portion of the inner pipe second length portion abuts against the end piece of the outer pipe second length portion.

4. The exhaust pipe of claim 1, wherein the adjacent ends of the first and second length portions are connected to one another in a fluid-tight manner.

5. The exhaust pipe of claim 1, and further comprising an encapsulating member for encasing the end pieces of the outer pipes of the first and second length portions in a fluid-tight manner to thereby compensate relative movements between the end pieces.

6. The exhaust pipe of claim 5, wherein the encapsulating member is a bellows.

7. The exhaust pipe of claim 1, wherein the first and second length portions have second ends facing away from the adjacent ends, and further comprising flanges for attachment to the second ends of the first and second length portions in one-to-one correspondence.

8. The exhaust pipe of claim 7, wherein the outer pipes and the inner pipes of the first and second length portions are securely fixed, at least indirectly, with the flanges.

9. The exhaust pipe of claim 1, wherein the inner pipe of the second length portion has a constant inner diameter which corresponds to an inner diameter of the inner pipe of the first length portion in the area of the annular gap of the second length portion.

10. The exhaust pipe of claim 1, wherein the first and second length portions have second ends facing away from the adjacent ends, said outer pipes of the first and second length portions being reduced in diameter in the area of the second ends.

11. The exhaust pipe of claim 1, wherein the first and second length portions are made through an internal high-pressure forming process.

12. The exhaust pipe of claim 1, and further comprising insulating material for filling the annular gap.

13. The exhaust pipe of claim 1, wherein the end pieces of the outer pipes of the first and second length portions and the end portion of the inner pipe of the first length portion are arranged adjacent to each other.

* * * * *